(12) United States Patent
Charipadi

(10) Patent No.: US 11,716,694 B2
(45) Date of Patent: Aug. 1, 2023

(54) ESTIMATING AND CONTROLLING TRANSMIT POWER OF USER EQUIPMENT BY A BASE STATION

(71) Applicant: CommScope Technologies LLC, Hickory, NC (US)

(72) Inventor: Gopikrishna Charipadi, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/777,139

(22) Filed: Jan. 30, 2020

(65) Prior Publication Data

US 2020/0252882 A1 Aug. 6, 2020

Related U.S. Application Data

(60) Provisional application No. 62/819,235, filed on Mar. 15, 2019.

(30) Foreign Application Priority Data

Jan. 31, 2019 (IN) .............................. 201911003953

(51) Int. Cl.
*H04W 52/24* (2009.01)
*H04W 52/32* (2009.01)
*H04W 52/36* (2009.01)

(52) U.S. Cl.
CPC ....... *H04W 52/242* (2013.01); *H04W 52/245* (2013.01); *H04W 52/325* (2013.01); *H04W 52/365* (2013.01)

(58) Field of Classification Search
CPC ............. H04W 52/242; H04W 52/245; H04W 52/325; H04W 52/365
See application file for complete search history.

(56) References Cited

U.S. PATENT DOCUMENTS 8,274,952 B2 9/2012 Jard et al.
9,072,064 B2 6/2015 Zhang et al.
(Continued)

FOREIGN PATENT DOCUMENTS

KR 101178244 B1 9/2012
KR 20140054082 A 5/2014
(Continued)

OTHER PUBLICATIONS

Charipadi, Gopikrishna et al., "Gain Control for a Radio Frequency (RF) Front-End of a Base Station", U.S. Appl. No. 16/085,526, filed Sep. 14, 2018, pp. 1-47, Published: US.
(Continued)

*Primary Examiner* — Yuwen Pan
*Assistant Examiner* — Angelica Perez
(74) *Attorney, Agent, or Firm* — Fogg & Powers LLC

(57) ABSTRACT

One embodiment is directed to a method of estimating a transmit power of a UE. The method comprises determining, at a base station serving the UE, a received power for the UE, determining, at the base station, a path loss for the UE, and determining, at the base station, the transmit power for the UE as a function of the received power for the UE and the path loss for the UE. The method can be used when the first UE has reached or exceeded a maximum reported power headroom (PHR) for the UE and can be used for performing transmit power control for the UE as a function of the determined transmit power for the UE. Other embodiments are disclosed. The described embodiments can be used in a cloud radio access network (C-RAN) as well as other types of base stations.

30 Claims, 8 Drawing Sheets

(56) References Cited

U.S. PATENT DOCUMENTS

| | | |
|---|---|---|
| 9,112,471 B1 | 8/2015 | Jain et al. |
| 9,124,234 B1 | 9/2015 | Petrovic |
| 9,166,630 B1 | 10/2015 | Miller et al. |
| 10,070,394 B2 | 9/2018 | Kim et al. |
| 10,244,472 B2 | 3/2019 | Fazel Sarjoui et al. |
| 2002/0045459 A1 | 4/2002 | Morikawa |
| 2004/0052320 A1 | 3/2004 | Lennen |
| 2005/0079842 A1 | 4/2005 | Shi |
| 2008/0102794 A1 | 5/2008 | Keevill et al. |
| 2009/0042594 A1* | 2/2009 | Yavuz ................ H04W 52/244 455/522 |
| 2009/0290516 A1 | 11/2009 | Han et al. |
| 2010/0041427 A1 | 2/2010 | Hannu et al. |
| 2011/0096736 A1 | 4/2011 | Kwon et al. |
| 2011/0096869 A1 | 4/2011 | Nakayama |
| 2011/0136533 A1* | 6/2011 | Senarath ............ H04W 74/002 455/522 |
| 2011/0201332 A1 | 8/2011 | Siomina et al. |
| 2012/0149422 A1* | 6/2012 | Ye ........................ H04W 52/50 455/522 |
| 2013/0044842 A1 | 2/2013 | Wang et al. |
| 2013/0176874 A1* | 7/2013 | Xu ..................... H04W 52/242 370/252 |
| 2013/0309988 A1 | 11/2013 | Ji et al. |
| 2014/0249998 A1 | 9/2014 | Gotanda et al. |
| 2015/0341941 A1 | 11/2015 | Nguyen |
| 2016/0105853 A1 | 4/2016 | Zhao et al. |
| 2016/0335883 A1 | 11/2016 | Breed et al. |
| 2017/0251430 A1 | 8/2017 | Fazel Sarjoui et al. |
| 2018/0376432 A1* | 12/2018 | Kim ................... H04W 72/0413 |
| 2020/0059867 A1* | 2/2020 | Haghighat .......... H04W 52/367 |

FOREIGN PATENT DOCUMENTS

| | | |
|---|---|---|
| WO | 2013048526 A1 | 4/2013 |
| WO | 2015060562 A1 | 4/2015 |
| WO | 2015072703 A1 | 5/2015 |

OTHER PUBLICATIONS

International Searching Authority, "International Search Report and Written Opinion from PCT Application No. PCT/US2020/015850", from Foreign Counterpart to U.S. Appl. No. 16/777,139, dated May 22, 2020, pp. 1 through 13, Published: WO.

* cited by examiner

ESTIMATING AND CONTROLLING TRANSMIT POWER OF USER EQUIPMENT BY A BASE STATION

CROSS-REFERENCE TO RELATED APPLICATIONS

This application claims priority to Indian provisional patent application No. 201911003953, filed Jan. 31, 2019, which is hereby incorporated herein by reference in its entirety.

This application also claims the benefit of U.S. Provisional Patent Application Ser. No. 62/819,235, filed on Mar. 15, 2019, which is hereby incorporated herein by reference in its entirety.

BACKGROUND

A cloud radio access network (C-RAN) (also sometimes referred to as a centralized radio access network) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each controller is coupled to the radio points over front-haul communication links or a front-haul network.

A combining receiver is typically used for each UE in order to receive uplink transmissions from that UE. Each combining receiver combines baseband data generated from uplink signals received at a subset of the radio points. Each such subset of radio points is also referred to here as the "combining zone" for the UE.

As used here, "uplink reuse" or "intra-cell reuse" refer to situations where separate uplink data is simultaneously transmitted from multiple UEs to the same base station using the same resource elements (that is, the same time-frequency resources). Typically, intra-cell reuse can be employed for two UEs when the interference that the uplink transmissions of each UE cause at the radio points included in the other UE's combining zone is below a predetermined threshold.

However, there are usage scenarios where intra-cell reuse is used that may result in a UE transmitting at a power that is higher than necessary. This may result in excess battery consumption in the UE and an increase in the rise-over-thermal (RoT) ratio for the radio points that are not in that UE's combining zone.

SUMMARY

One embodiment is directed to a base station to provide wireless service to an item of user equipment (UE) using at least one cell. The base station comprises at least one radio frequency (RF) module comprising circuitry that implements an RF transceiver and couples the base station to one or more antennas. The base station further comprises processing circuitry configured to implement Layer-3 (L3), Layer-2 (L2), and Layer-1 (L1) functionality for a wireless protocol used to provide the wireless service to the UE via the cell. The base station is configured to estimate the transmit power of the UE by doing the following: determine a received power for the UE; determine a path loss for the UE; and determine the transmit power for the UE as a function of the received power for the UE and the path loss for the UE.

Another embodiment is directed to a method of estimating a transmit power of a user equipment (UE). The method comprises determining, at a base station serving said UE, a received power for said UE; determining, at the base station, a path loss for said UE; and determining, at the base station, the transmit power for said UE as a function of the received power for said UE and the path loss for said UE.

Another embodiment is directed to a base station to provide wireless service to an item of user equipment (UE) using at least one cell. The base station comprises at least one radio frequency (RF) module comprising circuitry that implements an RF transceiver and couples the base station to one or more antennas. The base station further comprises processing circuitry configured to implement Layer-3 (L3), Layer-2 (L2), and Layer-1 (L1) functionality for a wireless protocol used to provide the wireless service to the UE via the cell. The base station is configured to perform the following while a power headroom (PHR) reported by the UE is equal to or greater than a maximum reported PHR for the UE: if a signal-to-interference-plus-noise (SINR) reported by the UE exceeds a target SINR required for a modulation and coding scheme (MCS) used by the UE to transmit to the base station, instruct the UE to reduce the transmit power of the UE; and if the SINR reported by the UE falls below the target SINR required for the MCS used by the UE to transmit to the base station, instruct the UE to increase the transmit power of the UE.

Another embodiment is directed to a method of controlling a transmit power of a user equipment (UE), The method comprises while a power headroom (PHR) reported by the UE is equal to or greater than a maximum reported PHR for the UE: if a signal-to-interference-plus-noise (SINR) reported by the UE exceeds a target SINR required for a modulation and coding scheme (MCS) used by the UE to transmit to a base station, instruct the UE to reduce the transmit power of the UE; and if the SINR reported by the UE falls below the target SINR required for the MCS used by the UE to transmit to the base station, instruct the UE to increase the transmit power of the UE.

Other embodiments are disclosed.

The details of various embodiments are set forth in the accompanying drawings and the description below. Other features and advantages will become apparent from the description, the drawings, and the claims.

DRAWINGS

Figure 6:
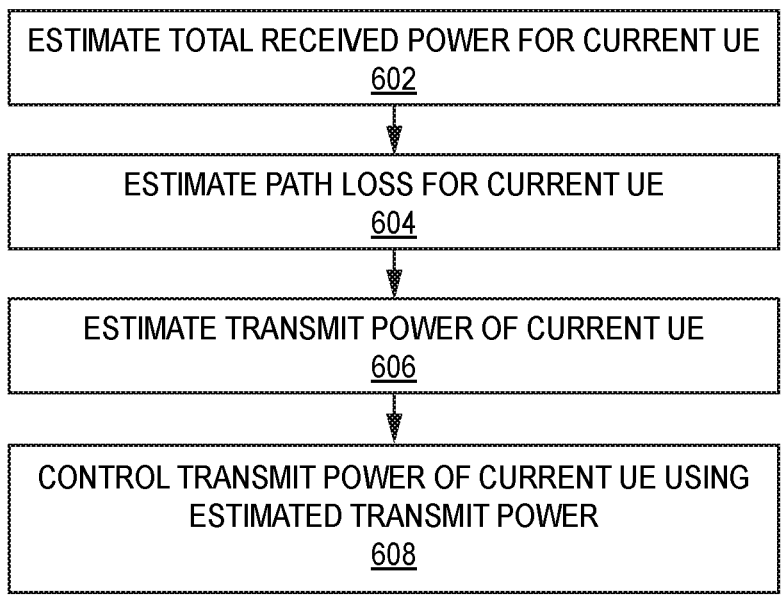

FIG. 6 comprises a high-level flowchart illustrating one exemplary embodiment of a method of estimating the transmit power of an item of user equipment (UE).

Figure 7:
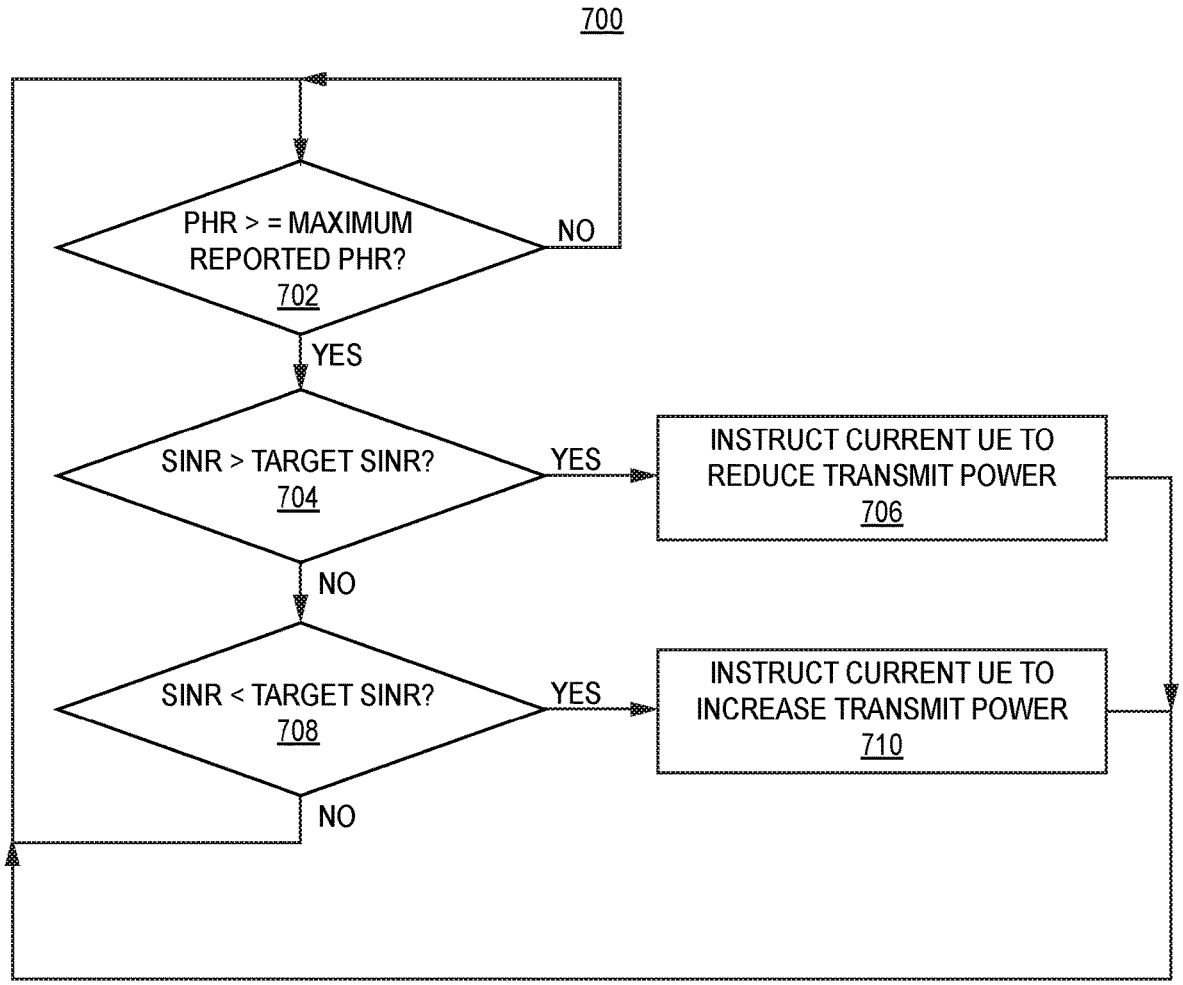

FIG. 7 comprises a high-level flowchart illustrating one exemplary embodiment of a method of controlling the transmit power of a UE.

Figure 8:
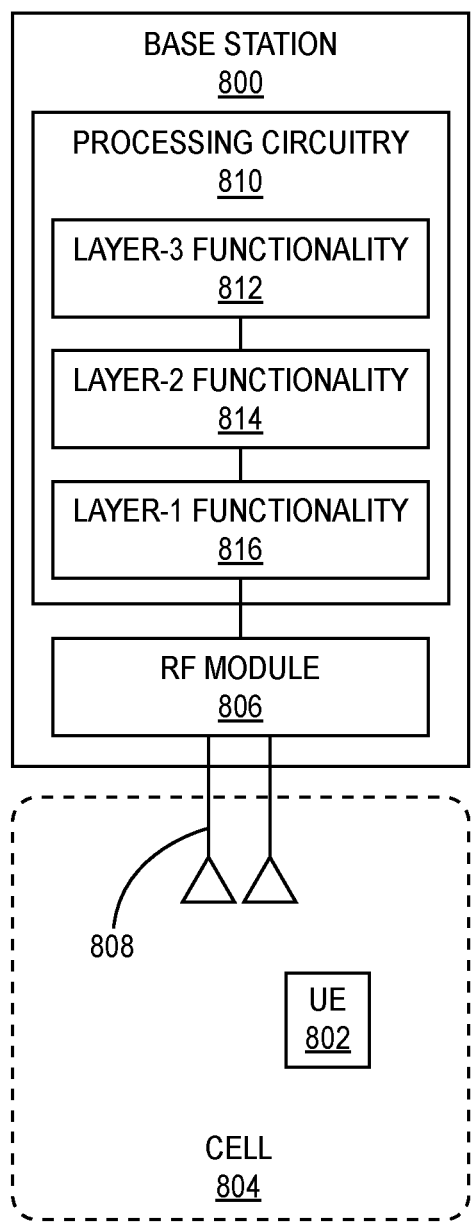

FIG. 8 illustrates one exemplary high-level embodiment of a base station that is configured to provide wireless service to a plurality of items user equipment (UE) using at least one cell.

Like reference numbers and designations in the various drawings indicate like elements.

DETAILED DESCRIPTION

Figure 1:
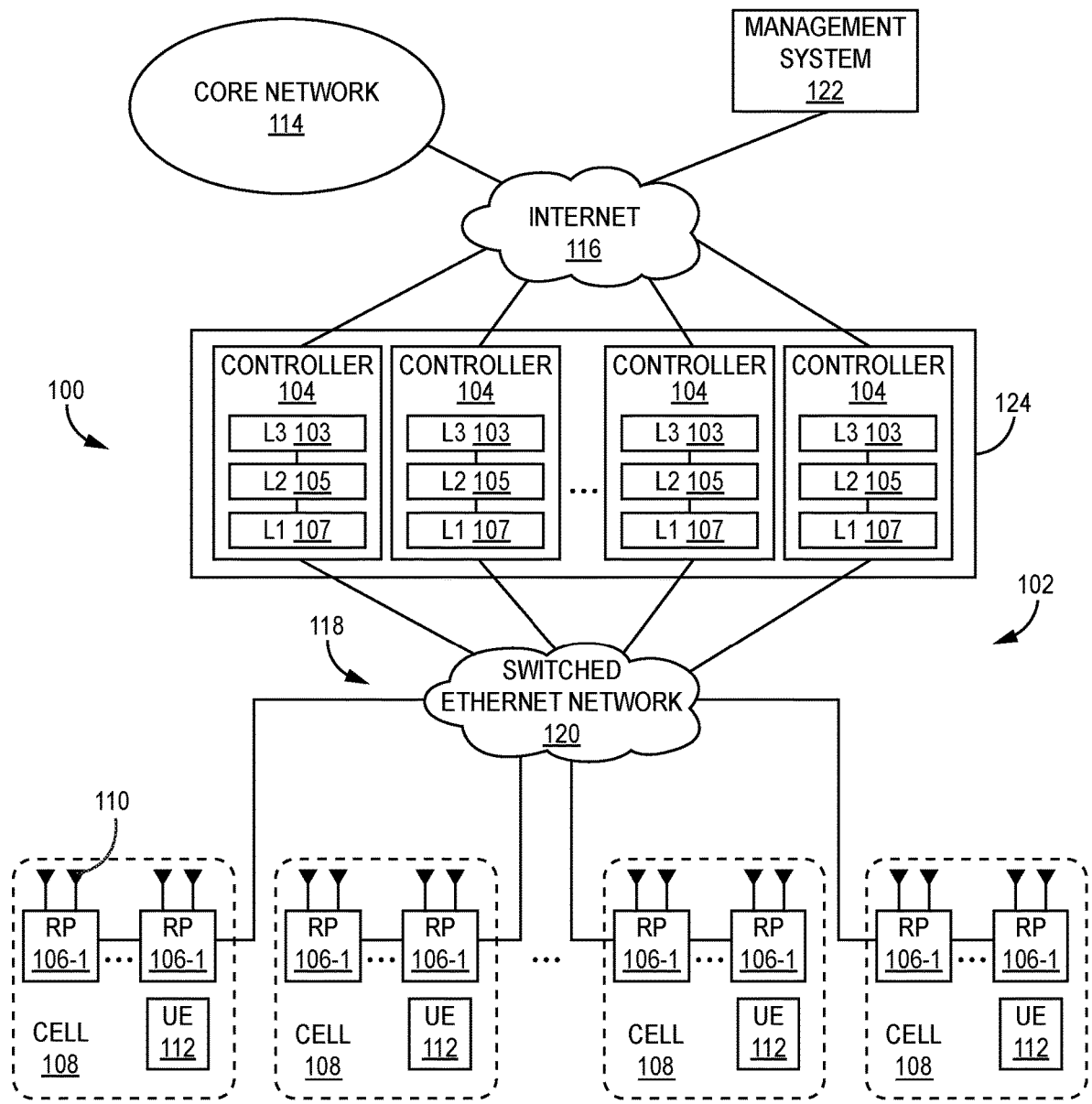
FIG. 1 is a block diagram illustrating one exemplary embodiment of a radio access network (RAN) system in which the UE transmit power estimation techniques described here can be used.

FIG. 1 is a block diagram illustrating one exemplary embodiment of a radio access network (RAN) system 100 in which the UE transmit power estimation techniques described here can be used. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN architecture that employs one or more baseband units 104 and multiple radio points (RPs) 106. The system 100 is also referred to here as a "C-RAN system" 100. Each RP 106 is remotely located from the one or more baseband units 104. Also, in this exemplary embodiment, at least one of the RPs 106 is remotely located from at least one other RP 106. The baseband units 104 and RPs 106 serve at least one cell 108. The baseband units 104 are also referred to here as "baseband controllers" 104 or just "controllers" 104. Each controller 104 performs various functions for the cell 108 including, without limitation, Layer-3 functionality 103, Layer-2 functionality 105, and Layer-1 functionality 107.

Each RP 106 includes or is coupled to one or more antennas 110 via which downlink RF signals are radiated to various items of user equipment (UE) 112 and via which uplink RF signals transmitted by UEs 112 are received.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

The system 100 is coupled to the core network 114 of each wireless network operator over an appropriate back-haul. In the exemplary embodiment shown in FIG. 1, the Internet 116 is used for back-haul between the system 100 and each core network 114. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by the 3GPP standards organization. In this embodiment, the controllers 104 and RPs 106 together are used to implement one or more LTE Evolved Node Bs (also referred to here as an "eNodeBs" or "eNBs") that are used to provide user equipment 112 with mobile access to the wireless network operator's core network 114 to enable the user equipment 112 to wirelessly communicate data and voice (using, for example, Voice over LTE (VoLTE) technology). These eNodeBs can be macro eNodeBs or home eNodeBs (HeNB).

Also, in this exemplary LTE embodiment, each core network 114 is implemented as an Evolved Packet Core (EPC) 114 comprising standard LTE EPC network elements such as, for example, a mobility management entity (MME) and a Serving Gateway (SGW) (all of which are not shown). Each controller 104 communicates with the MME and SGW in the EPC core network 114 using the LTE S1 interface. Also, each controller 104 communicates with other eNodeBs using the LTE X2 interface. For example, each controller 104 can communicate via the LTE X2 interface with an outdoor macro eNodeB (not shown) or another controller 104 in the same cluster 124 (described below) implementing a different cell 108. Although the exemplary embodiment of the system 100 shown in FIG. 1 is described here as being implemented as an LTE system, it is to be understood that the techniques described here can be implemented in systems that implement other protocols such as systems that implement Fifth Generation New Radio (5G NR) protocols or other protocols developed by the 3GPP standards organization or systems that implement Citizens Broadband Radio Service (CBRS) band protocols developed by the CBRS Alliance.

If the eNodeB implemented using one or more controllers 104 is a home eNodeB, the core network 114 can also include a Home eNodeB Gateway (not shown) for aggregating traffic from multiple home eNodeBs.

Each controller 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controllers 104 and the radio points 106 can implement one or more of the LTE transmission modes using licensed and/or unlicensed RF bands or spectrum. Moreover, the controllers 104 and/or the radio points 106 can be configured to support multiple wireless protocols, multiple carriers, and/or multiple wireless operators.

Each controller 104 is communicatively coupled to the radio points 104 using a front-haul network 118. In the exemplary embodiment shown in FIG. 1, the front-haul 118 that communicatively couples each controller 104 to one or more RPs 106 is implemented using a standard switched ETHERNET network 120. However, it is to be understood that the front-haul between the controllers 104 and RPs 106 can be implemented in other ways.

In the exemplary embodiment shown in FIG. 1, a management system 122 is communicatively coupled to the controllers 104 and RPs 106, for example, via the Internet 116 and ETHERNET network 120 (in the case of the RPs 106).

In the exemplary embodiment shown in FIG. 1, the management system 122 communicates with the various elements of the system 100 using the Internet 116 and the ETHERNET network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Generally, for each cell 108 implemented by the C-RAN 100, the corresponding controller 104 performs the air-interface Layer-3 (L3) and Layer-2 (L2) processing as well as at least some of the air-interface Layer-1 (L1) processing for the cell 108, where each of the radio points 106 serving that cell 108 perform the L1 processing not performed by the controller 104 as well as implementing the analog RF transceiver functions.

Different splits in the air-interface processing between each controller 104 and the radio points 106 can be used. In one example, the data front-hauled between the controller 104 and the RPs 106 is communicated as IQ data representing frequency-domain symbols for the air interface. This frequency-domain IQ data represents the symbols in the frequency domain before the inverse fast Fourier transform (IFFT) is performed, in the case of the downlink, and after the fast Fourier transform (FFT) is performed, in the case of the uplink. If this L1 split is used for downlink data, the IFFT and subsequent transmit L1 processing would be performed in each RP 106. Also, if this L1 split is used for uplink data, the FFT would be performed in each RP 106 and subsequent receive L1 processing would be performed in the controller 104.

Other splits can be used and data can communicated between the controllers 104 and the radio points 106 in other formats. In the following the description, the fronthaul data communicated between the controllers 104 and the radio points 106 for the air interface is generally referred to as "IQ data" even though such fronthaul data can take many forms, including forms that are not IQ data.

The split in the air-interface processing between each controller 104 and the radio points 106 used for the downlink can be different from the split used for the uplink. Also, for a given direction (downlink or uplink), the same split need not be used for all resources (for example, different splits can be used for different channels or for different resource blocks). Likewise, the form in which front-haul data is communicated in the downlink direction (that is, the direction from the controller 104 to the RPs 106) can differ from the form in which front-haul data is communicated in the uplink direction (that is, the direction from the RPs 106 to the controller 104). Also, for a given direction (downlink or uplink), not all front-haul data needs to be communicated in the same form (that is, the front-haul data for different channels or for different resource blocks can be communicated in different ways).

In one implementation, the radio point unit 106 comprises at least one radio frequency (RF) module. Each RF module comprises circuitry that implements the RF transceiver functions for a single instance of a radio point 106 and provides an interface to one or more antennas 110 associated with that instance of the radio point 106. More specifically, in the exemplary embodiment shown in FIG. 1, each RF module interfaces with a respective two antennas 110.

Each RF module comprise circuitry that implements, for the associated instance of a radio point 106, two downlink signal paths, one for each of the two antennas 110, and two uplink signals paths, one for each of the two antennas 110. In one exemplary implementation, each downlink signal path comprises a respective digital-to-analog converter (DAC) to convert downlink digital samples to a downlink analog signal, a respective frequency converter to upconvert the downlink analog to a downlink analog RF signal at the desired RF frequency, and a respective power amplifier (PA) to amplify the downlink analog RF signal to the desired output power for output via the antenna 110 associated with that downlink signal path. In one exemplary implementation, each uplink signal path comprises a respective low-noise amplifier (LNA) for amplifying an uplink analog RF signal received via the antenna 110 associated with the uplink signal path, a respective frequency converter to up-convert the received uplink analog RF signal to an uplink analog baseband frequency signal, a respective analog-to-digital converter (ADC) to convert the uplink analog baseband frequency signal to uplink digital samples. Each of the downlink and uplink signal paths can also include other conventional elements such as filters. Each RF module can be implemented using one or more RF integrated circuits (RFICs) and/or discrete components.

Each radio point unit 106 further comprises at least one network interface that is configured to communicatively couple the radio point 106 to the front-haul network 118. More specifically, in the exemplary embodiment shown in FIG. 1, the network interface comprises an ETHERNET network interface that is configured to communicatively couple that radio point 106 to the switched ETHERNET network 120 that is used to implement the front-haul 118 for the C-RAN 100.

Each radio point 106 further comprises one or more programmable devices that execute, or are otherwise programmed or configured by, software, firmware, or configuration logic in order to implement Layer-1 baseband processing described here as being performed by that radio point 106. The one or more programmable devices can be implemented in various ways (for example, using programmable processors (such as microprocessors, co-processors, and processor cores integrated into other programmable devices), programmable logic (such as field programmable gate arrays (FPGA), and system-on-chip packages)). Where multiple programmable devices are used, all of the programmable devices do not need to be implemented in the same way.

Referring again to FIG. 1, in this example, the "reuse zone" for a particular UE 112 is the set of one or more RPs 106 from which uplink transmissions from a particular UE 112 are received at good Signal-to-Interference-plus-Noise Ratio (SINR) whilst another neighboring UE 112 is reusing the same physical resource blocks (PRBs) for its uplink transmission to its associated set of one or more RPs 106. Also, as noted above, the combining receiver for each UE 112 combines baseband data generated from uplink signals received at a subset of the RPs 106, where this subset of the RPs 106 is also referred to here as the "combining zone" for that UE. The reuse zone and combining zone for a particular UE 112 do not necessarily need to include all the same RPs 106. Also, the reuse zone and combining zone need not be used for all channels or for all resources within a given channel.

In the exemplary embodiment described here in connection with FIG. 1, the reuse zone and combining zone for each UE 112 are determined by the serving controller 104 using a "signature vector" (SV) associated with that UE 112. In this embodiment, a signature vector is determined for each UE 112. The signature vector is determined based on receive power measurements for uplink transmissions from each UE 112 made at each of the RPs 106 serving a given cell 108.

When a UE 112 makes initial Physical Random Access Channel (PRACH) transmissions to access a cell 108, each RP 106 will receive those initial PRACH transmissions and a signal reception metric indicative of the power level of the PRACH transmissions received by that RP 106 is measured (or otherwise determined). One example of such a signal reception metric is a signal-to-interference-plus-noise-ratio (SINR). The signal reception metrics that are determined based on the PRACH transmissions are also referred to here as "PRACH metrics."

Each signature vector is determined and updated over the course of that UE's connection to the cell 108 based on Sounding Reference Signals (SRS) transmitted by the UE 112. A signal reception metric indicative of the power level of the SRS transmissions received by the RPs 106 (for example, a SINR) is measured (or otherwise determined). The signal reception metrics that are determined based on the SRS transmissions are also referred to here as "SRS metrics."

The signature vector can be used to determine the RP 106 having the best signal reception metric by scanning or sorting the elements of the signature vector to find the element having the best signal reception metric. The RP 106 that corresponds to that "best" element is also referred to here as the "primary RP 106" for the UE 112. The signature vector for each UE 112 can also be used to determine the reuse zone and the combining zone for that UE 112. In general, the reuse zone and combining zone can be determined by selecting those RPs 106 having corresponding signal reception metrics that are above a predetermined threshold and/or satisfy some other condition. A preliminary reuse zone or combining zone determined for a UE 112 can also be expanded to include additional RPs 106 or shrunk to include fewer RPs 106 based on other considerations.

Figure 2:
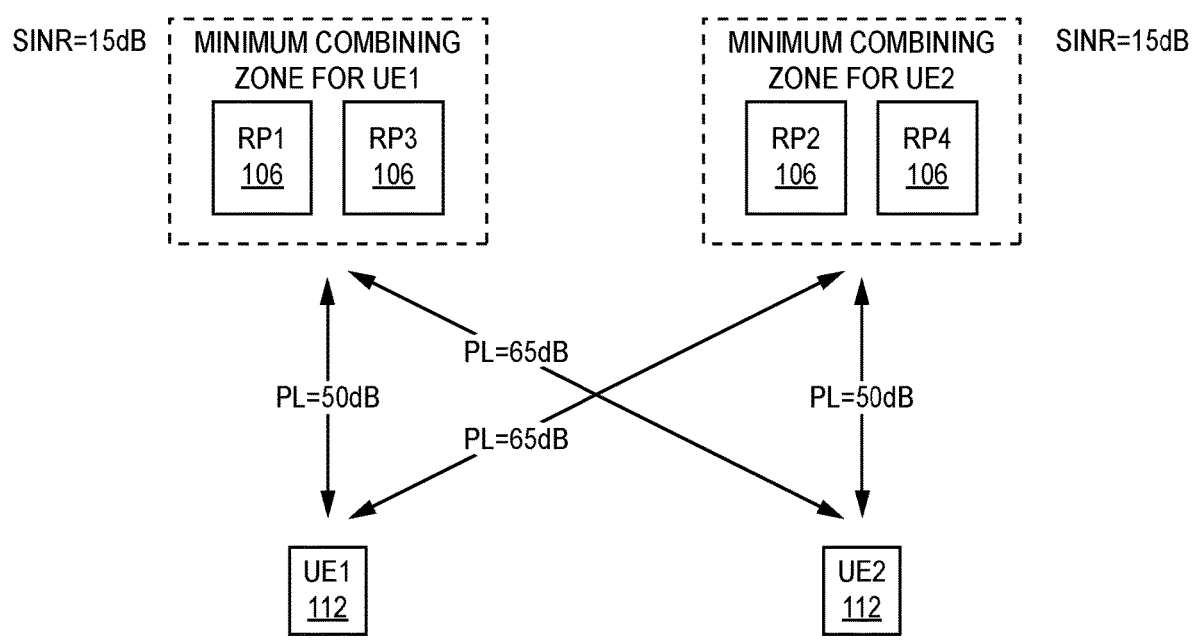
FIG. 2 illustrates one example of intra-cell reuse being used in the C-RAN of FIG. 1.

The C-RAN 100 shown in FIG. 1 is configured to support intra-cell reuse. As noted above, "uplink reuse" and "intra-cell reuse" refer to situations where separate uplink data is simultaneously transmitted from multiple UEs 112 to the C-RAN 100 using the same physical resource blocks (PRBs). This is done in order to increase the communication capacity provided by the C-RAN 100 for the coverage area of the cell 108 for a given amount of radio frequency bandwidth. FIG. 2 illustrates one example of intra-cell reuse being used in the C-RAN 100 of FIG. 1. In the example shown in FIG. 2, a first UE 112 (individually referenced in FIG. 2 as "UE1") has two RPs 106 (each of which is individually referenced in FIG. 2 as "RP1" and "RP3," respectively) included in its respective combining zone.

Also, in this example, a second UE 112 (individually referenced in FIG. 2 as "UE2") has two different RPs 106 (each of which is individually referenced in FIG. 2 as "RP2" and "RP4," respectively) included in its respective combining zone. For the PRBs for which intra-cell reuse is used, the combining receiver for UE1 combines baseband data generated from uplink signals received at the RP1 and RP3 (which are the RPs 106 in UE1's combining zone). Likewise, for the PRBs for which intra-cell reuse is used, the combining receiver for UE2 combines baseband data generated from uplink signals received at the RP2 and RP4 (which are the RPs 106 in UE2's combining zone). However, for the PRBs for which intra-cell reuse is used, the transmissions from UE2, as received by RP1 and RP3, cause interference in the combining receiver for UE1, and the transmissions from UE1, as received by RP2 and RP4, cause interference in the combining receiver for UE2. That is, transmissions from a given UE 112 in intra-cell reuse cause interference at those RPs 106 that are outside of that UE's combining zone. This interference is also referred to here as "intra-cell reuse interference."

The scheduler in the controller 104 is configured to employ intra-cell reuse for two UEs 112 when the ratio of signal power received by uplink transmissions of each UE 112 at the radio points 106 included in each UE's combining zone and the intra-cell reuse interference caused by the uplink transmissions of each UE 112 at the radio points 106 included in the other UE's combining zone is below a predetermined SINR threshold. Also, the controller 104 controls the maximum transmit power of UEs 112 in intra-cell reuse in order to attempt to maintain the intra-cell reuse interference caused at the RPs 106 in the combining zones of the other UEs 112 in intra-cell reuse below an acceptable level (also referred to here as the "reuse interference threshold"). In one implementation of such an embodiment, the reuse interference threshold is typically in the range of −110 decibel-milliwatts (dBm)/resource block (RB) to −70 dBm/RB.

In the example shown in FIG. 2, a path loss (PL) of at least 50 decibels (dB) is typical between a UE 112 and the radio points 106 in that UE's combining zone. In this example, a minimum reuse SINR of 15 dB is required between the radio points 106 in the combining zone of a given UE 112 and the radio points 106 in the combining zone of each other UE 112 that is in intra-cell reuse with that UE 112 so that good uplink sector throughput is obtained from all such UEs 112 in intra-cell reuse. Therefore, in this example, a path loss (PL) of 65 dB is required between each UE 112 in intra-cell reuse and the radio points 106 in the combining zone of each other UE 112 that is in intra-cell reuse with that UE 112.

In the example shown in FIG. 2, the C-RAN 100 is configured so that the Physical Uplink Shared Channel (PUSCH) bandwidth uses 20 Mhz of bandwidth (that is, 100 Resource Blocks (RBs) per transmission time interval (TTI)) and is configured to use a reuse interference threshold of −85 dBm/RB.

A first use case involving the example shown in FIG. 2 (also referred to here as "Case A") depicts an interference limited scenario followed by an interference less scenario. Initially, during the interference limited scenario, both UE1 and UE2 are involved in active sessions involving both uplink and downlink transmissions. During the interference limited scenario, UE1 and UE2 are put into intra-cell reuse and assuming that 50% of the PUSCH bandwidth (that is, 50 RBs per TTI, which corresponds to 10 Mhz) is allocated for intra-cell reuse by UE1 and UE2 and the remaining 50% of the bandwidth is allocated by the controller 104 to other UEs 112 (not shown in FIG. 2) in the C-RAN 100 by the scheduler implemented in the controller 104. As shown in FIG. 2, during the interference limited scenario, while UE1 and UE2 are both transmitting using the reused PRBs, the radio points 106 in the combining zones for each of UE1 and UE2 receives transmissions from that respective UE1 or UE2 at a signal-to-interference-plus-noise ratio (SINR) of 15 dB, which corresponds to a received signal power of −70 dBm/RB (which results from a transmit power of −20 dBm/RB for that UE1 or UE2 minus a path loss of +50 dB for transmissions from that UE1 or UE2) with the interference resulting from the transmissions of the other UE1 or UE2 limited to −85 dBm/RB (which results from a transmit power of −20 dBm/RB for that other UE1 or UE2 minus a path loss of +65 dB for transmissions from that other UE1 or UE2).

In this Case A, at some point UE2 finishes its call session and detaches from the C-RAN 100, which commences the interference less scenario. During the interference less scenario, the radio points RP1 and RP3 in the combining zone for UE1 will no longer experience intra-cell reuse interference resulting from transmissions from UE2 (which was at −85 dBm/RB earlier), while UE1 continues to transmit at −20 dBm/RB, which corresponds to −3 dBm/10 Mhz. As a result, the Layer-2 power control implemented by the controller 104 will estimate that UE1 is now operating at a very high SINR of 44 dB, which corresponds to a received signal power of −53 dBm/10 Mhz (since −70 dBm/RB corresponds to −53 dBm/10 Mhz) and a noise floor of −97 dBm/10 Mhz for a radio point 106 with a noise figure (NF) of 7 dB. (The SINR of 44 dB equals −53 dBm/10 Mhz minus −97 dBm/10 Mhz.) In response to the Layer-1 functionality 107 in the controller 104 estimating that UE1 is now operating at a very high SINR of 44 dB, the Layer-2 power control implemented by the controller 104 will send transmit power control (TPC) "down" commands to UE1 in order to command UE1 to lower its transmit power. This is done to try to bring down the received SINR at the RPs 106 in the combining zone of UE1 from 44 dB to a target SINR of 21 dB, which is the target SINR necessary for 64 Quadrature Amplitude Modulation (QAM) to be demodulated. In this example, each TPC down command causes UE1 to reduce its transmit power by 1 dB.

Also, each UE 112 determines its power headroom (PHR) and reports it to the controller 104. Power headroom is defined by the 3GPP and is calculated by the following equation:

Power Headroom (PHR)=$P_{MAX}$-$P_{TX}$ where $P_{MAX}$ is the maximum transmit power of the relevant UE class, and $P_{TX}$ is the current average transmit power of the relevant UE 112. In this example, $P_{MAX}$ equals 23 dBm and, as noted above, $P_{TX}$ is initially equal to −3 dBm/10 Mhz, which corresponds to an initial PHR of +26 dB. The 3GPP limits the PHR that a UE 112 can report to a maximum of 40 dB. Therefore, in this example, the controller 104 repeatedly transmits TPC down commands to UE1 until the transmit power of UE1 reaches −17 dBm/10 Mhz (which in this example occurs after 14 TPC down commands are sent). When the transmit power of UE1 reaches −17 dBm/10 Mhz, the UE1 will report the maximum PHR of 40 dB to the controller 104, which causes the controller 104 to stop sending TPC down commands to UE1. At this point, the received power level at the radio points 106 in the combining zone for UE1 (that is, RP1 and RP3) equals −67 dBm/10 Mhz (which results from a transmit power of −17 dBm/RB for that UE1 minus a path loss of +50 dB for transmissions from that UE1). Also, the received SINR at the RPs 106 in the combining zone of UE1 is 30 dB, which corresponds to a received signal power of −67 dBm/10 Mhz and a noise floor of −97 dBm/10 Mhz. In other words, at this point, UE1 is transmitting 9 dBm higher ("hotter") than is required for the target SINR of 21 dB necessary for 64 QAM to be demodulated. In general, UE1 transmitting hotter than necessary results in UE1 consuming more battery power than is necessary.

A second use case involving the example shown in FIG. 2 (also referred to here as "Case B") depicts a noise limited scenario (with no interference) where, right from the start, only UE1 is involved in an active session and UE2 is not. In this scenario, the path loss compensation functionality in UE1 causes it to transmit on the PUSCH at a power level of −43 dBm/RB, which corresponds to a nominal PUSCH power ("P0 Nominal PUSCH") of −93 dBm/RB plus a path loss of +50 dB. This power level of −43 dBm/RB corresponds to an uplink PUSCH transmit power level for UE1 of −26 dBm/10 Mhz. In this scenario, the received SINR at the RPs 106 in the combining zone of UE1 is 21 dB, which corresponds to a received signal power of −76 dBm/10 Mhz and a noise floor of −97 dBm/10 Mhz.

In Case B (the noise limited scenario), UE1 is automatically transmitting at the lowest power required for achieving the target SINR of 21 dB necessary for 64 QAM to be used. In comparison to Case A (the interference limited scenario followed by the interference less scenario) for the same conditions (that is, a path loss of +50 dB), the power control function in the controller 104 stops reducing the PUSCH transmit power of UE1 when it reaches −17 dBm/RB since UE1 does not report a PHR greater than 40 dB, thereby causing UE1 to transmit 9 dB hotter than is required for the target SINR of 21 dB necessary for 64 QAM to be demodulated.

This issue of a UE 112 transmitting hotter than is required is more pronounced if lower RB grants are used for PUSCH transmissions. For example, a RB grant of 10 RBs for the PUSCH is typical for a Transfer Communication Protocol (TCP) session involving only downlink Hypertext Transfer Protocol (HTTP) user traffic (which will require a high RB grant for the PDSCH), in which case there will be very little uplink traffic needed (typically for sending TCP acknowledgements at around 1 Megabits-per-second (Mbps)). Voice-over-LTE (VoLTE) is another application that involves a very low traffic rate in the uplink and downlink of around 1 Mbps). Alternatively, the issue of a UE 112 transmitting hotter than is required is more pronounced if a lower LTE system bandwidth is used for the PUSCH. The following table (Table 1) illustrates the increase in excess PUSCH transmit power for UE1 in Case A in the example described above in connection with FIG. 2 for various PUSCH RB grant sizes and LTE PUSCH bandwidths.

TABLE 1

| LTE system Bandwidth or UL RB grant size | Actual PHR (dB) | Reported PHR as per LTE spec (dB) | Excess Tx power (dB) |
|---|---|---|---|
| 20 Mhz (100 RBs) | 46 | 40 | 6 |
| 10 Mhz (50 RBs) | 49 | 40 | 9 |
| 5 Mhz (25 RBs) | 52 | 40 | 12 |
| 10 RBs (HTTP or burst-traffic) | 56 | 40 | 16 |

Figure 3:
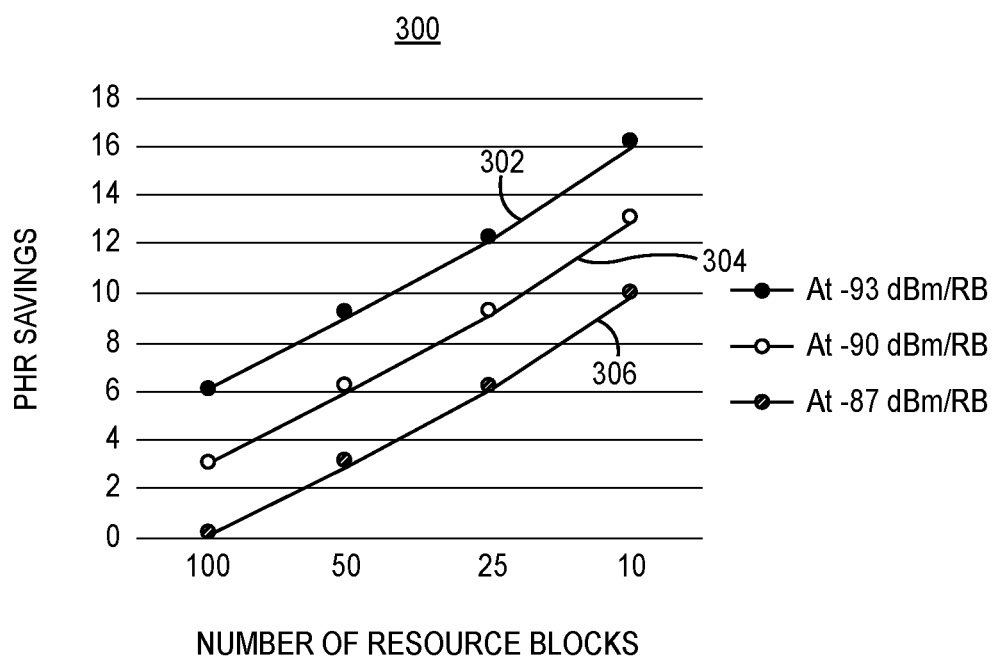
FIG. 3 is a chart showing the excess transmit power as a function of the Physical Uplink Shared Channel (PUSCH) resource block grant for radio points having various noise figures.

Moreover, if radio points 106 having higher noise figures are used, the nominal PUSCH power ("P0 Nominal PUSCH") would need to be increased in order to achieve the target SINR of 21 dB necessary for 64 QAM to be demodulated. FIG. 3 is a chart showing the excess transmit power as a function of the PUSCH resource block grant for radio points having various noise figures. A first line 302 illustrates the excess transmit power as a function of the PUSCH resource block grant for radio points 106 having a noise figure of 7 dB which requires a nominal PUSCH power of −93 dBm/RB to achieve a target SINR of 21 dB, which corresponds to the example described above. A second line 304 illustrates the excess transmit power as a function of the PUSCH resource block grant for radio points 106 having a noise figure of 10 dB which requires a nominal PUSCH power of −90 dBm/RB to achieve a target SINR of 21 dB. A third line 306 illustrates the excess transmit power as a function of the PUSCH resource block grant for radio points 106 having a noise figure of 13 dB which requires a nominal PUSCH power of −87 dBm/RB to achieve a target SINR of 21 dB. As shown in FIG. 3, while increasing the nominal PUSCH power reduces the excess transmit power of a UE 112 in Case A described above, the excess transmit power is still significant for a TCP session involving only downlink HTTP user traffic which typically requires around 10 RBs.

In addition to increasing battery consumption in the UE 112, another issue with a UE 112 transmitting hotter than is required is that it contributes to an increased uplink rise-over-thermal (RoT) and hence uplink interference at the radio points 106 that are not in the combining zone of that UE 112.

Figure 4:
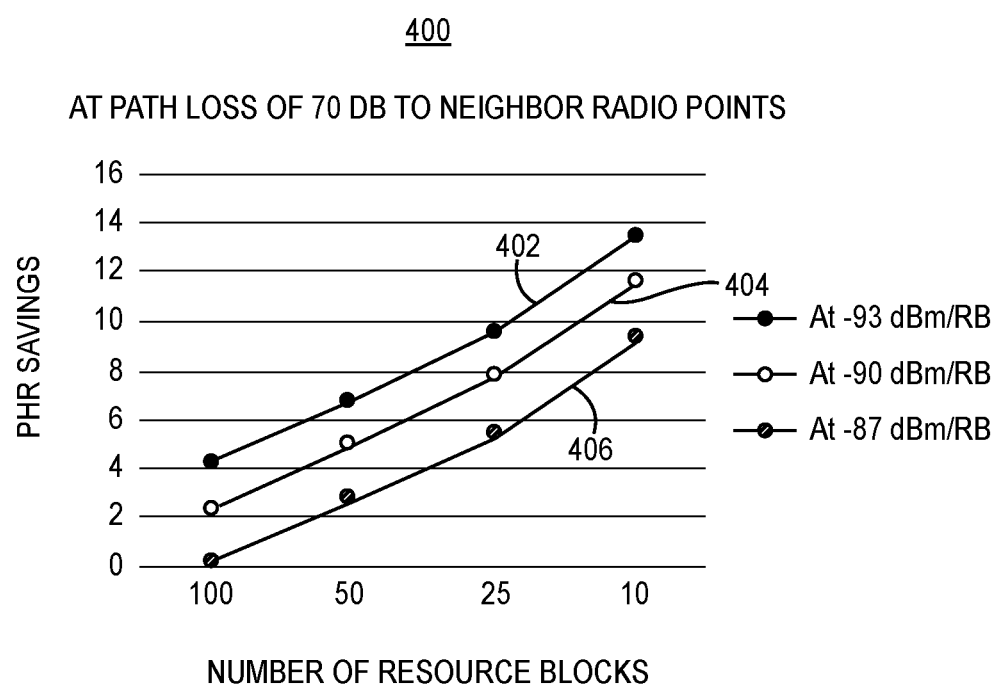
FIG. 4 is a chart showing the excess transmit power as a function of the PUSCH resource block grant for radio points having various noise figures.

Referring again to the example described above in connection with FIG. 2, in Case B (the noise limited scenario), the RoT is 3.5 dB, which corresponds to the minimum transmit power for UE1 to achieve the target SINR of 21 dB necessary for 64 QAM to be demodulated. This is determined based on an interference power level at the radio points 106 outside of the combining zone of UE1 (that is, RP2 and RP4) transmitting at −43 dBm/RB, which corresponds to −96 dBm/10 Mhz and results from a transmit power level of −26 dBm/10 Mhz minus an assumed path loss in this example of 70 dB for the radio points 106 that are outside of the combining zone of UE1. This interference power level of −96 dBm/10 Mhz is added to the thermal noise floor of −97 dBm/10 Mhz (assuming a noise figure of 7 dB). In Case A (the interference limited scenario followed by the interference less scenario), when UE1 reports a PHR of 40 dB, the power controller function in the controller 104 will stop sending TPC down commands and the transmit power will be −17 dBm/10 Mhz. This transmit power results in an interference power level at the radio points 106 outside of the combining zone of UE1 (that is, RP2 and RP4) of −87 dBm/10 Mhz, which results from a transmit power of −17 dBm/10 Mhz minus the assumed path loss in this example of 70 dB for the radio points 106 that are outside of the combining zone of UE1. This contributes to a RoT of 10.4 dB, which is 6.9 dB higher than would be the case if the controller 104 could cause UE1 to further reduce its transit power below −17 dBm/10 Mhz when the actual PHR for UE1 is greater than 40 dB. The following table (Table 2) shows, for the example described above in connection with FIG. 2, the RoT at a PHR of 40 dB for various PUSCH RB grants and the difference (delta) between the RoT at a PHR of 40 dB and the RoT at the minimum transmit power to achieve the target SINR of 21 dB necessary for 64 QAM to be demodulated (that is, 3.5 dB in this example).

target SINR of 21 dB necessary for 64 QAM to be demodulated. FIG. 4 is a chart showing the excess transmit power as a function of the PUSCH resource block grant for radio points having various noise figures. A first line 402 illustrates the excess transmit power as a function of the PUSCH resource block grant for radio points 106 having a noise figure of 7 dB which requires a nominal PUSCH power of −93 dBm/RB to achieve a target SINR of 21 dB and which corresponds to the example described above. A second line 404 illustrates the excess transmit power as a function of the PUSCH resource block grant for radio points 106 having a noise figure of 10 dB which requires a nominal PUSCH power of −90 dBm/RB to achieve a target SINR of 21 dB. A third line 406 illustrates the excess transmit power as a function of the PUSCH resource block grant for radio points 106 having a noise figure of 13 dB which requires a nominal PUSCH power of −87 dBm/RB to achieve a target SINR of 21 dB. As shown in FIG. 4, increasing the nominal PUSCH power reduces the excess transmit power of a UE 112 in Case A described above and, therefore, reduces the resulting increase in RoT at the radio points 106 that are not in the combining zone of the transmitting UE 112 due to the excess transmit power. However, as shown in FIG. 4, the excess transmit power (and the corresponding increase in RoT at the radio points 106 that are not in the combining zone of the transmitting UE 112) is still significant for a TCP session involving only downlink HTTP user traffic which typically requires around 10 RBs.

Wireless service providers reuse their licensed radio frequency (RF) spectrum such that different base stations in the wireless service provider's network use the same RF spectrum for the PUSCH. This reuse is also referred to here as "macro reuse" or "inter-cell reuse." When multiple base stations in a wireless service provider's network use the same RF spectrum for the PUSCH (that is, are in inter-cell reuse), the PUSCH transmissions from UEs 112 served by a base station will cause interference at the other base stations in inter-cell reuse with that base station. This interference is also referred to here as "outgoing interference".

Multiple instances of the C-RAN 100 shown in FIG. 1 can be placed in inter-cell reuse with each other when deployed together to implement multiple sectors in a relatively small area. This can occur, for example, where multiple instances of the C-RAN 100 shown in FIG. 1 are used to provide wireless service in a stadium. The power control function in each controller 104 is configured to manage the transmit power of each attached UE 112 in order to keep the outgoing interference below a predetermined threshold (also referred to here as the "outgoing interference threshold").

Figure 5:
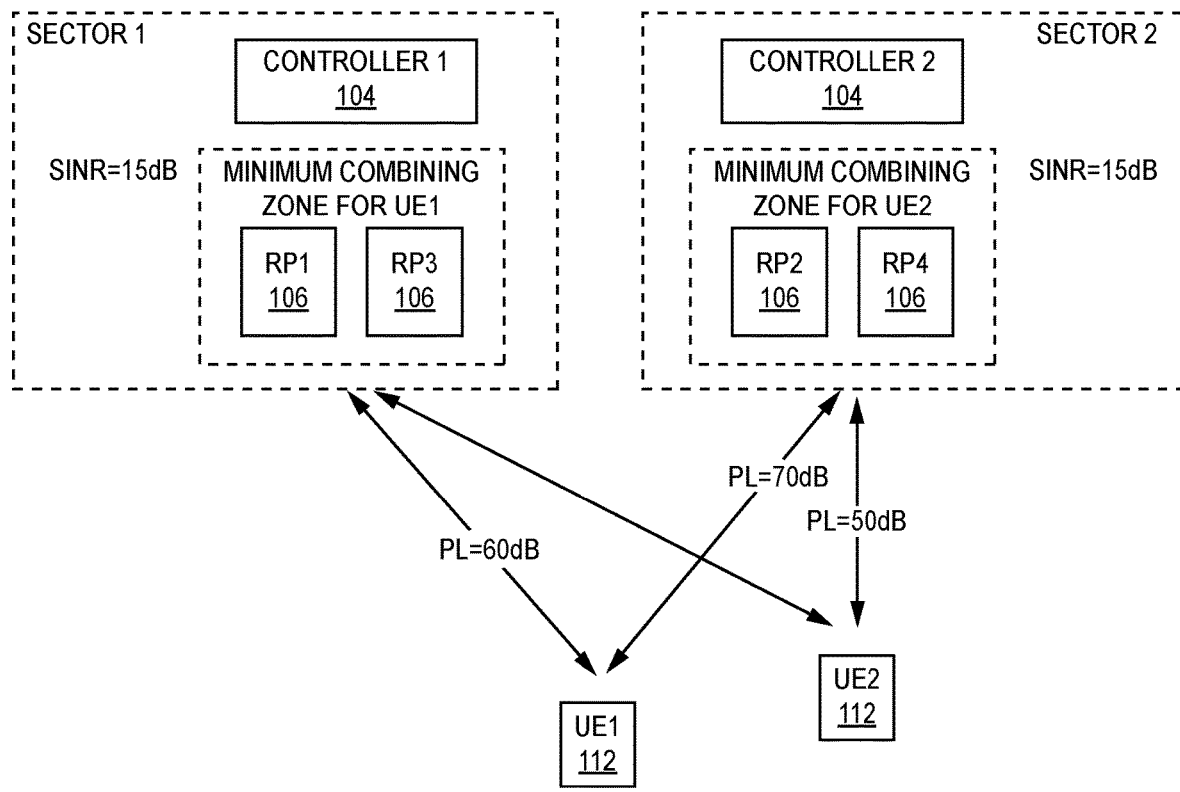
FIG. 5 illustrates one example of inter-cell reuse being used in the C-RAN of FIG. 1.

FIG. 5 illustrates one example of inter-cell reuse being used in the C-RAN 100 of FIG. 1. In the example shown in FIG. 5, a first controller 104 and a respective two RPs 106

TABLE 2

| UL RB grant size | PHR-actual (dB) | UE Tx-power actual (dBm) | PHR reported by UE (dB) | RP Noise floor (@7 dB NF) | Neigh. RP Power (dBm) | RoT (dB) @ UE Tx-power actual | Neigh RP Noise Power (dBm) @ PHR = 40 i.e., UE Tx-pwr = −17 dBm | RoT (dB) at PHR = 40 | delta UE Tx-power savings (dB) |
|---|---|---|---|---|---|---|---|---|---|
| 100 | 46 | −23 | 40 | −94 | −93 | 3.5 | −87 | 7.8 | 4.25 |
| 50 | 49 | −26 | 40 | −97 | −96 | 3.5 | −87 | 10.4 | 6.87 |
| 25 | 52 | −29 | 40 | −100 | −99 | 3.5 | −87 | 15.2 | 9.68 |
| 10 | 56 | −33 | 40 | −104 | −103 | 3.5 | −87 | 17 | 13.54 |

Moreover, if radio points 106 having higher noise figures are used, the nominal PUSCH power ("P0 Nominal PUSCH") would need to be increased in order to achieve the (each of which is individually referenced in FIG. 5 as "controller1", "RP1," and "RP3," respectively) serve a first sector and a first UE 112 (individually referenced in FIG. 5 as "Sector1" and "UE1", respectively), and a second controller 104 and a respective two RPs 106 (each of which is individually referenced in FIG. 5 as "controller2", "RP2," and "RP4," respectively) serve a second sector and a second UE 112 (individually referenced in FIG. 5 as "Sector2" and "UE2", respectively). In this example, RP1 and RP3 are in the combining zone for UE1, and RP2 and RP4 are in the combining zone for UE2. Except as noted below, the example depicted in FIG. 5 is the same as the example depicted in FIG. 2.

Normally, in order to control inter-cell uplink interference, a maximum RoT of 6 dB is permitted among base stations that are in inter-cell reuse. In the example depicted in FIG. 5, a noise floor of −97 dBm/10 Mhz is experienced for radio points 106 with a noise figure (NF) of 7 dB. Thus, a RoT of 6 dB corresponds to a received interference level of −91 dBm/10 Mhz, which corresponds to a noise floor −97 dBm/10 Mhz plus the RoT of 6 dB. As a result, the power controller function in the controller 104 of each C-RAN 100 will manage the transmit power of any UE served by that controller 104 so that it will not cause more than −91 dBm/10 Mhz of interference at any other C-RAN 100 in inter-cell reuse with that C-RAN 100. In the example shown in FIG. 5, controller1 manages the transmit power of UE1 so that the outgoing interference caused by the PUSCH transmissions from UE1 at RP2 and RP4 does not exceed −91 dBm/10 Mhz, which corresponds to −108 dBm/RB. Likewise, controller2 manages the transmit power from UE2 so that the outgoing interference caused by the PUSCH transmissions of UE2 at RP1 and RP3 does not exceed −91 dBm/10 Mhz. In this example, C-RAN1 and C-RAN2 are configured to use an outgoing interference threshold of −108 dBm/RB.

As noted above in connection with the description of Case B, when UE1 is positioned relative to RP1 and RP3 so as to have a path loss of 50 dB, it will transmit at −26 dBm/10 Mhz in an interference less environment. If the UE1 then moves further away from RP1 and RP3 towards the edge of sector1 so that its path loss to RP1 and RP3 increases to 60 dB, the UE1, by virtue of the path loss compensation function implemented in it, compensates for the increased path loss and transmit hotter by 10 dB. It will do this by transmitting at a power of −16 dBm/10 Mhz. At this point, because the PHR reported by UE1 is 40 dB, the power controller function in the controller1 will stop sending TPC down commands to UE1. However, this results in higher outgoing interference at RP2 and RP4. RP2 and RP4 will experience outgoing interference of −86 dBm/10 Mhz (resulting from a UE transmit power of −16 dBm/10 Mhz at the edge of sector) minus a pathloss to neighboring RPs 106 of 70 dB), which exceeds the outgoing interference threshold used for this example of −108 dBm/RB, which corresponds to −91 dBm/10 Mhz. That is, the outgoing interference from UE1 cannot be managed so that it remains below the specified outgoing interference threshold.

The effects of not being able to manage the outgoing interference of a UE 112 so that it remains below the specified outgoing interference threshold worsens as the size of the PUSCH RB grant decreases. For example, where 25 PUSCH RBs are granted to UE1 in the example described above (that is, 25% of the 20 Mhz LTE Bandwidth used for the PUSCH), a UE transmit power of −29 dBm/5 MHz is required at a path loss of 50 dB. As UE1 moves further away towards the edge of sector), at a path loss of 62 dB to RP1 and RP3, the path loss compensation function in UE1 automatically increases the transmit power of UE1 so that it transmits hotter by 12 dB, going from −29 dBm/5 Mhz to −17 dBm/5 Mhz. As a result, RP2 and RP4 will experience outgoing interference of −84 dBm/5 Mhz (resulting from a transmit power by UE1 of −17 dBm/5 Mhz at the edge of sector1 minus a pathloss to neighboring RPs 106 of 68 dB), which exceeds the outgoing interference threshold by 10 dB (that is, −108 dBm/RB, which corresponds to −94 dBm/5 Mhz). As discussed above, the amount of outgoing interference increases as the PUSCH RB grant size decreases.

Even though the UEs 112 are not able to report a PHR greater than 40 dB, Section 6.3.2.3 of 3GPP Specification No. 36.521 requires the UEs 112 to be able to transmit on the PUSCH, without any uplink performance impact, with a minimum output power of −40 dBm for all LTE Bandwidths. Thus, it is possible for the UEs 112 to be power controlled to lower transmit powers in situations where the maximum reported PHR range has been reached by the UEs 112. Doing this when it is appropriate can reduce the battery consumption in the UEs 112 and can reduce Rise-over-Thermal interference in neighboring RPs 106 that are in intra-cell reuse or inter-cell reuse.

FIG. 6 comprises a high-level flowchart illustrating one exemplary embodiment of a method 600 of estimating the transmit power of a UE. The embodiment of method 600 shown in FIG. 6 is described here as being implemented using the C-RAN 100 described above in connection with FIG. 1, though it is to be understood that other embodiments can be implemented in other ways.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling. Moreover, one or more aspects of method 600 can be configurable or adaptive (either manually or in an automated manner). For example, various measurements or statistics can be captured and used to fine tune the method 600.

The particular UE 112 for which the embodiment of method 600 is described here as being performed is referred to here as the "current UE" 112. Also, method 600 can be implemented by the controller 104 serving the current UE 112.

Method 600 is suitable for use when the maximum reported PHR has been reached or exceeded by the current UE 112. As noted above, once the maximum reported PHR (for example, 40 dB) has been reached by the current UE 112, the current UE 112 will not report a PHR greater than the maximum reported PHR, even if the transmit power of the current UE 112 has been reduced below the value that corresponds to the maximum reported PHR. The estimated transmit power level for the current UE 112 obtained using method 600 can be used, for example, to further control the transmit power level of the current UE 112 so as to have the current UE 112 transmit at the minimum power level necessary for the UE 112 to meet the target SINR required for the maximum Modulation and Coding Scheme (MCS) to be used for the PUSCH and so as to keep the intra-cell interference and inter-cell interference below the reuse interference threshold and the outgoing interference threshold, respectively.

Method 600 comprises estimating the total received power for the current UE 112 (block 602). In this embodiment, this is done using the Demodulation Reference Signals (DMRSs) that are transmitted in every resource block transmitted by the current UE 112 on the PUSCH. The LTE specification 36.211 requires, for each resource block transmitted by a UE, that the UE to transmit a DMRS in that resource block at the same power level as user symbols included that resource block. The Layer-1 functionality 107 in the controller 104 is configured to estimate the average power spectral density $DMRS_{PUSCH}$ of the received DMRS included in each PUSCH resource block transmitted by each UE 112. From this, the total PUSCH received power $P_{PUSCH}$ for each UE 112 can be computed by the Layer-2 functionality 105 in the controller 104 using the following equation:

$$P_{PUSCH}=DMRS_{PUSCH}+10\log_{10}(M)$$

where M is the number of resource blocks transmitted in that received transmission time interval (TTI) by the UE 112, which is scheduled by the Layer-2 functionality 105 four TTIs prior to that received TTI. (In the scheduling time interval of a TTI, which is one millisecond, two DMRS symbols will be received by the Layer-1 functionality 107 and the $DMRS_{PUSCH}$ estimated and sent to the Layer-2 functionality 105 in the controller 104, where the $DMRS_{PUSCH}$ represents the power spectral density per RB averaged across these two DMRS symbols).

Method 600 comprises estimating the path loss for the current UE 112 (block 604). In this embodiment, this is done using the downlink Cell Specific Reference Signals (CS-RSs) that are transmitted on the PDSCH at a specified transmit power $P_{CS-RS}$, where the transmit power level $P_{CS-RS}$ is configured by the Layer-3 functionality 103 in the controller 104 and reported to the Layer-2 functionality 105. Also, the Layer-3 functionality 103 in the controller 104 is configured to instruct the current UE 112 to send it a Reference Signal Received Power ($RSRP_{ServingCell}$) report periodically. Then, the path loss $PL_{PUSCH}$ can be computed, by the Layer-2 functionality 105, using the following equation:

$$PL_{PUSCH}=P_{CS-RS}-RSRP_{ServingCell}$$

If all UEs 112 that have reached the maximum reported PHR send $RSRP_{ServingCell}$ reports too frequently, the associated processing and signaling load can become too high. In order to address this issue, the Layer-3 functionality 103 in the controller 104 can be configured to have each UE 112 make such $RSRP_{ServingCell}$ reports only when "requested" by the controller 104. The controller 104 can be configured to make such a request for a $RSRP_{ServingCell}$ report by sending a RRC reconfiguration message to the UE 112 configuring that UE 112 to make a $RSRP_{ServingCell}$ report in response to an LTE A1 measurement event with a low event trigger threshold (for example, the minimum trigger threshold for the Reference Signal Received Power, which is −140 dBm). An LTE A1 measurement event configures the UE 112 to send a $RSRP_{ServingCell}$ report to the controller 104 when the associated event trigger threshold has been exceeded. In response to the controller 104 sending such a RRC reconfiguration message, the UE 112 will immediately send a $RSRP_{ServingCell}$ report. This is because the Reference Signal Received Power measured by the UE 112 will be above the event trigger threshold since the RSRP measured by a UE 112 that has reached the maximum reported PHR will always be well above −140 dBm. Thereafter, until the controller 104 makes another such "request" by sending another RRC reconfiguration message to the UE 112, the UE 112 will typically not make any further $RSRP_{ServingCell}$ reports. This is because the Reference Signal Received Power will remain above the event trigger threshold and subsequent $RSRP_{ServingCell}$ reports will not be triggered. Alternatively, the controller 104 can, in making such a "request" by sending a RRC reconfiguration message to the UE 112 with "periodic reporting" configured, enable the UE 112 to periodically send $RSRP_{ServingCell}$ reports to the Layer-3 functionality 103 in the controller 104 that are spaced apart by a reasonably large "report interval".

There may be some uncertainty in the estimated path loss $PL_{PUSCH}$ due to the effects of short-term fading on the Reference Signal Received Power measurement made by the current UE 112.

One way that this can be addressed is by configuring the Layer-3 functionality 103 in the controller 104 to instruct the current UE 112 to take an average of the RSRP measurement across multiple (N) Radio frames. This can be done by configuring the associated LTE A1 measurement event so that the "report amount" (defined by the relevant 3GPP specifications) is a number N of evenly spaced apart frames. This is done so that in the Layer-2 functionality 105 in the controller 104 the effects of short-term fading can be averaged out of the $RSRP_{ServingCell}$ reports sent by the current UE 112. In addition, the controller 104 can be configured to instruct the UE 112 to filter the multiple RSRP measurements using a 3GPP-defined Infinite Impulse Response (IIR) leaky-bucket filter, the coefficients of which can be configured by the Layer-2 functionality 105 in the controller 104 so as to vary the damping factor or the smoothing of the filter output via a System Information broadcast message signaled from the controller 104 to all UEs 112 in the coverage area of the C-RAN 100.

Furthermore, as described above, once the controller 104 receives an initial $RSRP_{ServingCell}$ report from an UE 112 for estimating the path loss $PL_{PUSCH}$, the Layer-3 functionality 103 in the controller 104 can be configured to reconfigure the PHR trigger event for that UE 112 to be based on the "dl-PathlossChange" trigger event (defined by the relevant 3GPP specifications) so as to make the UE 112 send a PHR report only when the UE 112 measures a specified path loss change (for example, 1 dB, 3 dB or 6 dB relative to the last transmitted PHR) due to, for example, the UE 112 moving. This causes the UE 112 to reduce the frequency at which the UE 112 makes such PHR reports. The Layer-3 functionality 103 in the controller 104 can be configured to, in response to receiving a new PHR report from that UE 112, request the current UE 112 to make a new $RSRP_{ServingCell}$ report by sending a RRC reconfiguration message of the type described above. At this point, the controller 104 can compute an updated estimated path loss $PL_{PUSCH}$ and updated transmit power for the current UE 112.

In cases where the current UE 112 has no PUSCH grant in a large portion of the TTIs (burst traffic, for example), the total received power for the current UE 112 can be estimated in the same manner described above for DMRSs transmitted on the PUSCH, using the DMRSs that are transmitted by the current UE 112 on the PUCCH or using the Sound Reference Signals (SRSs).

Method 600 further comprises estimating the transmit power of the current UE 112 as a function of the total received power and the path loss (block 606). In this embodiment, the Layer-2 functionality 105 in the controller 104 is configured to determine the transmit power of the current UE 112 using the following equation:

$$P_{TX}=P_{PUSCH}+PL_{PUSCH}$$

In the exemplary embodiment shown in FIG. 6, method 600 further comprises controlling the transmit power of the current UE 112 using the estimated transmit power of the current UE 112 (block 608). For example, the controller 104 can be configured to use the estimated transmit power to calculate a PHR for the current UE 112 using the equation noted above. The calculated PHR will be greater than the maximum reported PHR (for example, greater than 40 dB). The calculated PHR can then be used by the PHR-based Layer-2 power control implemented by the controller 104 (for example, used to send additional TCP down commands to the current UE 112 in order to reduce the transmit power until the current UE 112 transmits at the minimum power level necessary for the current UE 112 to meet the target SINR required for the MCS used for the PUSCH or in order to keep the intra-cell interference and inter-cell interference below the reuse interference threshold and the outgoing interference threshold, respectively). In another example, the controller 104 can be configured so that, when the PHR reported by the current UE 112 reaches the maximum reported PHR, the Layer-2 power control implemented by the controller 104 can be extended to use the estimated transmit power directly to control the transmit power of the current UE 112.

By enabling transmit power control for the current UE 112 to be performed in order to cause the current UE 112 to transmit at the minimum power level necessary for the current UE 112 to meet the target SINR required for the MCS used for the PUSCH even if the current UE 112 has reached (or exceeded) the maximum reported PHR, method 600 can be used to reduce battery consumption in the current UE 112. Also, by enabling transmit power control for the current UE 112 to be performed in order to keep the intra-cell interference and inter-cell interference below the reuse interference threshold and the outgoing interference threshold, respectively, even if the current UE 112 has reached (or exceeded) the maximum reported PHR, method 600 can be used to reduce Rise-over-Thermal interference in neighboring RPs 106 (or other base stations) that are in intra-cell reuse or inter-cell reuse with the UE 112 or the C-RAN 100.

Moreover, if method 600 is implemented in the C-RAN 100 (or another type of base station that makes use of a combining receiver), the transmit power for the current UE 112 that is estimated using method 600 would take into account the receive diversity combining gain resulting from the use of a combining receiver and multiple radio points 106 in the combining zone of the UE 112 (if it is the case that the combining zone for the current UE 112 includes multiple radio points 106). As a result, the transmit power for the current UE 112 can be further reduced in order to reflect the receive diversity combining gain. For example, if there are two radio points 106 in the combining zone for the current UE 112, a maximum receive diversity gain of 3 dB can be obtained, and, therefore, the transmit power for the current UE 112 could be further reduced by up to another 3 dB in order to reflect the receive diversity combining gain.

Another approach to controlling the transmit power of a UE 112 that has reached (or exceeded) the maximum reported PHR for that UE 112 is shown in FIG. 7. In the exemplary embodiment shown in FIG. 7, the transmit power for a UE 112 that has reached (or exceeded) its maximum reported PHR is explicitly controlled based on the SINR reported by that UE 112.

FIG. 7 comprises a high-level flowchart illustrating one exemplary embodiment of a method 700 of controlling the transmit power of a UE. The embodiment of method 700 shown in FIG. 7 is described here as being implemented using the C-RAN 100 described above in connection with FIG. 1, though it is to be understood that other embodiments can be implemented in other ways.

The blocks of the flow diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner). Also, most standard exception handling is not described for ease of explanation; however, it is to be understood that method 700 can and typically would include such exception handling. Moreover, one or more aspects of method 700 can be configurable or adaptive (either manually or in an automated manner). For example, various measurements or statistics can be captured and used to fine tune the method 700.

The particular UE 112 for which the embodiment of method 700 is described here as being performed is referred to here as the "current UE" 112. Also, method 700 can be implemented by the controller 104 serving the current UE 112.

Method 700 is performed while the PHR reported by the current UE 112 is equal to or greater than the maximum reported PHR for the current UE 112 (checked in block 702). As noted above, once the maximum reported PHR (for example, 40 dB) has been reached by the current UE 112, the current UE 112 will not report a PHR greater than the maximum reported PHR, even if the transmit power of the current UE 112 has been reduced below the value that corresponds to the maximum reported PHR for the current 112.

Method 700 further comprises, if the SINR reported by the current UE 112 exceeds the target SINR required for the MCS used for the PUSCH (block 704), instructing the current UE 112 to reduce its transmit power (block 706). In this embodiment, the controller 104 measures the SINR for the current UE 112 (for example, based on the DMRS transmissions received at each RP 106). If the measured SINR for the current UE 112 exceeds the target SINR required for the maximum MCS used for the PUSCH, the controller 104 is configured to send a TPC down command to the current UE 112, which causes the current UE 112 to reduce its transmit power.

Method 700 further comprises, if the SINR reported by the current UE 112 falls below the target SINR required for the MCS used for the PUSCH (block 708), instructing the current UE 112 to increase its transmit power (block 710). In this embodiment, if the measured SINR for the current UE 112 falls below the target SINR required for the maximum MCS used for the PUSCH (while the PHR remains at or above the maximum reported PHR), the controller 104 is configured to send a TPC up command to the current UE 112, which causes the current UE 112 to increase its transmit power.

Method 700 can be used to perform transmit power control for the current UE 112 in order to cause the current UE 112 to transmit at the minimum power level necessary for the current UE 112 to meet the target SINR required for the maximum MCS used for the PUSCH, even if the current UE 112 has reached (or exceeded) the maximum reported PHR for the current UE 122. By doing this method 700 can be used to reduce battery consumption in the current UE 112. This approach does not require the current UE 112 to be configured to send periodic Reference Signal Received Power (RSRP$_{ServingCell}$) reports to the controller 104. However, this approach is not suitable for performing explicit transmit power control to keep the intra-cell interference and inter-cell interference caused by a UE 112 below the reuse interference threshold and the outgoing interference threshold, respectively.

Although methods 600 and 700 are described above as being implemented in the C-RAN 100 of FIG. 1, it is to be understood that methods 600 and 700 can be implemented in other types of base stations.

FIG. 8 illustrates one exemplary high-level embodiment of a base station 800 that is configured to provide wireless service to a plurality of user equipment (UEs) 802 using at least one cell 804.

The base station 800 comprises at least one radio frequency (RF) module 806. Each RF module 806 comprises circuitry that implements an RF transceiver and couples the base station 800 to one or more antennas 808. The RF module 806 can be implemented in the same manner as described above in connection with FIG. 1.

In the exemplary embodiment shown in FIG. 8, the base station 800 comprises processing circuitry 810 configured to implement Layer-3 (L3) functionality 812, Layer-2 (L2) functionality 814, and Layer-1 (L1) functionality 816 for the wireless protocol used to provide the wireless service to the UEs 802 via the cell 804.

The processing circuitry 810 (and the functionality described as being included therein), as well as the base station 800 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. The processing circuitry 810, and the base station 800 more generally, can be implemented in other ways.

The base station 800 shown in FIG. 8 is suitable for implementing methods 600 and 700 of FIGS. 6 and 7, respectively. More specifically, in one implementation, the processing associated with methods 600 and 700 can be implemented in the processing circuitry of 810 of base station 800.

Other embodiments are implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a base station to provide wireless service to an item of user equipment (UE) using at least one cell, the base station comprising: at least one radio frequency (RF) module comprising circuitry that implements an RF transceiver and couples the base station to one or more antennas; and processing circuitry configured to implement Layer-3 (L3), Layer-2 (L2), and Layer-1 (L1) functionality for a wireless protocol used to provide the wireless service to the UE via the cell; wherein the base station is configured to estimate the transmit power of the UE by doing the following: determine a received power for the UE; determine a path loss for the UE; and determine the transmit power for the UE as a function of the received power for the UE and the path loss for the UE.

Example 2 includes the base station of Example 1, further comprising at least one controller and a plurality of radio points; wherein each of the radio points is associated with at least one antenna and remotely located from the controller, wherein the plurality of radio points is communicatively coupled to the controller; wherein the controller is communicatively coupled to a core network of a wireless service provider; wherein each of the radio points comprises a respective RF module; wherein at least some of the processing circuitry is implemented in the controller; and wherein the controller is configured to estimate the transmit power of the UE.

Example 3 includes the base station of any of Examples 1-2, wherein the base station is configured to estimate the transmit power of the UE when the UE has reached or exceeded a maximum reported power headroom (PHR) for the first UE.

Example 4 includes the base station of any of Examples 1-3, wherein the base station is configured to perform transmit power control for the UE as a function of the determined transmit power for the UE.

Example 5 includes the base station of Example 4, wherein the base station is configured to perform transmit power control for the UE as a function of the determined transmit power for the UE in order to cause the UE to transmit at a minimum power level necessary for the UE to meet a target SINR required for a modulation and coding scheme (MCS) used for transmissions from the UE.

Example 6 includes the base station of any of Examples 4-5, wherein the base station is configured to perform transmit power control for the UE as a function of the determined transmit power for the UE in order to reduce battery consumption in the UE.

Example 7 includes the base station of any of Examples 4-6, wherein the base station is configured to perform transmit power control for the UE as a function of the determined transmit power for the UE in order to keep at least one of: intra-cell interference caused by transmissions of the UE below an intra-cell interference threshold and inter-cell interference caused by transmissions of the UE below an inter-cell interference threshold.

Example 8 includes the base station of any of Examples 4-7, wherein the base station is configured to perform transmit power control for the UE as a function of the determined transmit power for the UE in order to reduce Rise-over-Thermal interference in neighboring radio points or base stations.

Example 9 includes the base station of any of Examples 1-8, wherein the base station is configured to determine the received power for the UE by: determining a power spectral density of Demodulation Reference Signals (DMRSs) transmitted by the UE; and determining the received power for the UE as a function of the power spectral density of the DMRSs transmitted by the UE and the number of RBs granted by the L2 functionality.

Example 10 includes the base station of any of Examples 1-9, wherein the base station is configured to determine the path loss for the UE by: configuring the L3 functionality with a specified transmit power for Cell Specific Reference Signals (CS-RSs) depending on the LTE system bandwidth; reporting, to the L2 functionality by the L3 functionality, the specified transmit power for the CS-RSs configured; transmitting, to the UE, the CS-RSs at the specified transmit power; receiving a Reference Signal Received Power (RSRP) reported by the UE; and determining the path loss for the UE as a function of the specified transmit power level at which the CS-RSs are transmitted to the UE and the RSRP reported by the UE.

Example 11 includes the base station of Example 10, wherein the base station is configured to reduce the frequency at which the RSRP is reported by the UE to the base station by doing the following: configure the UE to report to the base station a power headroom (PHR) measured by the UE in response to a trigger event that is based on a downlink pathloss change (dl-PathlossChange) trigger event; and cause the UE to report a respective RSRP in response to receiving each PHR measured and reported by the UE.

Example 12 includes the base station of any of Examples 10-11, wherein the base station is configured to reduce uncertainty in the estimated path loss due to short-term fading on the RSRP reported by the UE to the base station by instructing the UE to use an average of measurements across multiple radio frames for the RSRP reported by the UE.

Example 13 includes the base station of Example 12, wherein the base station is configured to reduce uncertainty in the estimated path loss due to short-term fading on the RSRP reported by the UE to the base station by also instructing the UE to filter the measurements across multiple radio frames using an Infinite Impulse Response (IIR) leaky-bucket filter, wherein the UE is instructed to configure coefficients of the filter so as to vary a damping factor or smoothing of the filter.

Example 14 includes the base station of any of Examples 1-13, wherein the base station is configured to determine the transmit power for the UE as a sum of the received power for the UE and the path loss for the UE.

Example 15 includes the base station of any of Examples 1-14, wherein the base station is configured to implement a combining receiver; and wherein the transmit power of the UE estimated by the base station takes into account receive diversity combining gain resulting from use of the combining receiver.

Example 16 includes a method of estimating a transmit power of a user equipment (UE), the method comprising: determining, at a base station serving said UE, a received power for said UE; determining, at the base station, a path loss for said UE; and determining, at the base station, the transmit power for said UE as a function of the received power for said UE and the path loss for said UE.

Example 17 includes the method of Example 16, wherein the method is performed when the first UE has reached or exceeded a maximum reported power headroom (PHR) for said UE.

Example 18 includes the method of any of Examples 16-17, further comprising performing transmit power control for said UE as a function of the determined transmit power for said UE.

Example 19 includes the method of Example 18, wherein performing transmit power control for said UE as a function of the determined transmit power for said UE comprises: performing transmit power control for said UE as a function of the determined transmit power for said UE in order to cause said UE to transmit at a minimum power level necessary for said UE to meet a target SINR required for a modulation and coding scheme (MCS) used for transmissions from said UE.

Example 20 includes the method of any of Examples 18-19, wherein performing transmit power control for said UE as a function of the determined transmit power for said UE comprises: performing transmit power control for said UE as a function of the determined transmit power for said UE in order to reduce battery consumption in said UE.

Example 21 includes the method of any of Examples 18-20, wherein performing transmit power control for said UE as a function of the determined transmit power for said UE comprises: performing transmit power control for said UE as a function of the determined transmit power for said UE in order to keep at least one of: intra-cell interference caused by transmissions of said UE below an intra-cell interference threshold and inter-cell interference caused by transmissions of said UE below an inter-cell interference threshold.

Example 22 includes the method of any of Examples 18-21, wherein performing transmit power control for said UE as a function of the determined transmit power for said UE comprises: performing transmit power control for said UE as a function of the determined transmit power for said UE in order to reduce Rise-over-Thermal interference in neighboring radio points or base stations.

Example 23 includes the method of any of Examples 16-22, wherein determining the received power for said UE comprises: determining a power spectral density of Demodulation Reference Signals (DMRSs) transmitted by said UE; and determining the received power for said UE as a function of the power spectral density of the DMRSs transmitted by said UE and the number of RBs granted by L2 functionality in the base station.

Example 24 includes the method of any of Examples 16-23, wherein determining the path loss for said UE comprises: configuring the L3 functionality with a specified transmit power for Cell Specific Reference Signals (CS- RSs) depending on the LTE system bandwidth; reporting, to the L2 functionality by the L3 functionality, the specified transmit power for the CS-RSs configured; transmitting, to the UE, the CS-RSs at the specified transmit power; receiving a Reference Signal Received Power (RSRP) reported by the UE; and determining the path loss for the UE as a function of the specified transmit power level at which the CS-RSs are transmitted to the UE and the RSRP reported by the UE.

Example 25 includes the method of Example 24, further comprising reducing the frequency at which the RSRP is reported by said UE to the base station by doing the following: configuring said UE to report to the base station a power headroom (PHR) measured by said UE in response to a trigger event that is based on a downlink pathloss change (dl-PathlossChange) trigger event; and causing said UE to report a respective RSRP in response to receiving each PHR measured and reported by said UE.

Example 26 includes the method of any of Examples 24-25, further comprising reducing uncertainty in the estimated path loss due to short-term fading on the RSRP reported by the UE to the base station by instructing the UE to use an average of measurements across multiple radio frames for the RSRP reported by the UE.

Example 27 includes the method of any of Examples 24-26, further comprising reducing uncertainty in the estimated path loss due to short-term fading on the RSRP reported by the UE to the base station by also instructing the UE to filter the measurements across multiple radio frames using an Infinite Impulse Response (IIR) leaky-bucket filter, wherein the UE is instructed to configure coefficients of the filter so as to vary a damping factor or smoothing of the filter.

Example 28 includes the method of any of Examples 16-27, wherein determining the transmit power for the first UE as a function of the received power for the first UE and the path loss for the first UE comprises: summing the received power for the first UE and the path loss for the first UE.

Example 29 includes the method of any of Examples 16-28, wherein the base station comprises at least one controller and a plurality of radio points; wherein each of the radio points is associated with at least one antenna and remotely located from the controller, wherein the plurality of radio points is communicatively coupled to the controller; wherein the controller is communicatively coupled to a core network of a wireless service provider.

Example 30 includes the method of any of Examples 16-29, wherein the base station is configured to implement a combining receiver; and wherein determining, at the base station, the transmit power for said UE comprises taking into account receive diversity combining gain resulting from use of the combining receiver.

Example 31 includes a base station to provide wireless service to an item of user equipment (UE) using at least one cell, the base station comprising: at least one radio frequency (RF) module comprising circuitry that implements an RF transceiver and couples the base station to one or more antennas; and processing circuitry configured to implement Layer-3 (L3), Layer-2 (L2), and Layer-1 (L1) functionality for a wireless protocol used to provide the wireless service to the UE via the cell; wherein the base station is configured to perform the following while a power headroom (PHR) reported by the UE is equal to or greater than a maximum reported PHR for the UE: if a signal-to-interference-plus-noise (SINR) reported by the UE exceeds a target SINR required for a modulation and coding scheme (MCS) used by the UE to transmit to the base station, instruct the UE to reduce the transmit power of the UE; and if the SINR reported by the UE falls below the target SINR required for the MCS used by the UE to transmit to the base station, instruct the UE to increase the transmit power of the UE.

Example 32 includes the base station of Example 31, wherein the base station is configured to instruct the UE to reduce the transmit power of the UE if the SINR reported by the UE exceeds the target SINR required for the MCS used by the UE to transmit to the base station while the PHR reported by the UE is equal to or greater than the maximum reported PHR for the UE by sending a first command to the UE explicitly instructing the UE to reduce the transmit power of the UE; and wherein the base station is configured to instruct the UE to increase the transmit power of the UE if the SINR reported by the UE falls below the target SINR required for the MCS used by the UE to transmit to the base station while the PHR reported by the UE is equal to or greater than the maximum reported PHR for the UE by sending a second command to the UE explicitly instructing the UE to increase the transmit power of the UE.

Example 33 includes the base station of any of Examples 31-32, further comprising at least one controller and a plurality of radio points; wherein each of the radio points is associated with at least one antenna and remotely located from the controller, wherein the plurality of radio points is communicatively coupled to the controller; wherein the controller is communicatively coupled to a core network of a wireless service provider; wherein each of the radio points comprises a respective RF module; wherein at least some of the processing circuitry is implemented in the controller; and wherein the controller is configured to perform the following while the PHR reported by the UE is equal to or greater than the maximum reported PHR for the UE: if the SINR reported by the UE exceeds the target SINR required for the MCS used by the UE to transmit to the base station, instruct the UE to reduce the transmit power of the UE; and if the SINR reported by the UE falls below the target SINR required for the MCS used by the UE to transmit to the base station, instruct the UE to increase the transmit power of the UE.

Example 34 includes a method of controlling a transmit power of a user equipment (UE), the method comprising: while a power headroom (PHR) reported by the UE is equal to or greater than a maximum reported PHR for the UE: if a signal-to-interference-plus-noise (SINR) reported by the UE exceeds a target SINR required for a modulation and coding scheme (MCS) used by the UE to transmit to a base station, instruct the UE to reduce the transmit power of the UE; and if the SINR reported by the UE falls below the target SINR required for the MCS used by the UE to transmit to the base station, instruct the UE to increase the transmit power of the UE.

Example 35 includes the method of Example 34, wherein the UE is instructed to reduce the transmit power of the UE if the SINR reported by the UE exceeds the target SINR required for the MCS used by the UE to transmit to the base station while the PHR reported by the UE is equal to or greater than the maximum reported PHR for the UE by sending a first command to the UE explicitly instructing the UE to reduce the transmit power of the UE; and wherein the UE is instructed to increase the transmit power of the UE if the SINR reported by the UE falls below the target SINR required for the MCS used by the UE to transmit to the base station while the PHR reported by the UE is equal to or greater than the maximum reported PHR for the UE by sending a second command to the UE explicitly instructing the UE to increase the transmit power of the UE.

Example 36 includes the method of any of Examples 34-35, wherein the base station comprises at least one controller and a plurality of radio points; wherein each of the radio points is associated with at least one antenna and remotely located from the controller, wherein the plurality of radio points is communicatively coupled to the controller; wherein the controller is communicatively coupled to a core network of a wireless service provider.

What is claimed is:

1. A base station to provide wireless service to a user equipment (UE) using at least one cell, the base station comprising:
at least one radio frequency (RF) module comprising circuitry that implements an RF transceiver and couples the base station to one or more antennas; and
processing circuitry configured to implement Layer-3 (L3), Layer-2 (L2), and Layer-1 (L1) functionality for a wireless protocol used to provide the wireless service to the UE via the cell;
wherein the base station is configured to estimate a current UE transmit power used by the UE to transmit to the base station by doing the following:
determine a received power for the UE;
determine a path loss for the UE; and
determine an estimate of the current UE transmit power used by the UE to transmit to the base station as a function of the received power for the UE and the path loss for the UE.

2. The base station of claim 1, further comprising at least one controller and a plurality of radio points;
wherein each of the radio points is associated with at least one antenna and remotely located from the controller, wherein the plurality of radio points is communicatively coupled to the controller;
wherein the controller is communicatively coupled to a core network of a wireless service provider;
wherein each of the radio points comprises a respective RF module;
wherein at least some of the processing circuitry is implemented in the controller; and
wherein the controller is configured to determine the estimate of the current UE transmit power used by the UE to transmit to the base station.

3. The base station of claim 1, wherein the base station is configured to determine the estimate of the current UE transmit power used by the UE to transmit to the base station when the UE has reached or exceeded a maximum reported power headroom (PHR) for the UE.

4. The base station of claim 1, wherein the base station is configured to perform transmit power control for the UE to control the transmit power used by the UE to transmit to the base station as a function of the determined estimate of the current UE transmit power used by the UE to transmit to the base station.

5. The base station of claim 4, wherein the base station is configured to perform transmit power control for the UE to control the transmit power used by the UE to transmit to the base station as a function of the determined estimate of the current UE transmit power used by the UE to transmit to the base station in order to cause the UE to transmit at a minimum power level necessary for the UE to meet a target SINR required for a modulation and coding scheme (MCS) used for transmissions from the UE.

6. The base station of claim 4, wherein the base station is configured to perform transmit power control for the UE to control the transmit power used by the UE to transmit to the base station as a function of the determined estimate of the current UE transmit power used by the UE to transmit to the base station in order to reduce battery consumption in the UE.

7. The base station of claim 4, wherein the base station is configured to perform transmit power control for the UE to control the transmit power used by the UE to transmit to the base station as a function of the determined estimate of the current UE transmit power used by the UE to transmit to the base station in order to keep at least one of: intra-cell interference caused by transmissions of the UE below an intra-cell interference threshold and inter-cell interference caused by transmissions of the UE below an inter-cell interference threshold.

8. The base station of claim 4, wherein the base station is configured to perform transmit power control for the UE to control the transmit power used by the UE to transmit to the base station as a function of the determined estimate of the current UE transmit power used by the UE to transmit to the base station in order to reduce Rise-over-Thermal interference in neighboring radio points or base stations.

9. The base station of claim 1, wherein the base station is configured to determine the received power for the UE by:
determining a power spectral density of Demodulation Reference Signals (DMRSs) transmitted by the UE; and
determining the received power for the UE as a function of the power spectral density of the DMRSs transmitted by the UE and the number of RBs granted by the L2 functionality.

10. The base station of claim 1, wherein the base station is configured to determine the path loss for the UE by:
configuring the L3 functionality with a specified transmit power for Cell Specific Reference Signals (CS-RSs) depending on the LTE system bandwidth;
reporting, to the L2 functionality by the L3 functionality, the specified transmit power for the CS-RSs configured;
transmitting, to the UE, the CS-RSs at the specified transmit power;
receiving a Reference Signal Received Power (RSRP) reported by the UE; and
determining the path loss for the UE as a function of the specified transmit power level at which the CS-RSs are transmitted to the UE and the RSRP reported by the UE.

11. The base station of claim 10, wherein the base station is configured to reduce the frequency at which the RSRP is reported by the UE to the base station by doing the following:
configure the UE to report to the base station a power headroom (PHR) measured by the UE in response to a trigger event that is based on a downlink pathloss change (dl-PathlossChange) trigger event; and
cause the UE to report a respective RSRP in response to receiving each PHR measured and reported by the UE.

12. The base station of claim 10, wherein the base station is configured to reduce uncertainty in the estimated path loss due to short-term fading on the RSRP reported by the UE to the base station by instructing the UE to use an average of measurements across multiple radio frames for the RSRP reported by the UE.

13. The base station of claim 12, wherein the base station is configured to reduce uncertainty in the estimated path loss due to short-term fading on the RSRP reported by the UE to the base station by also instructing the UE to filter the measurements across multiple radio frames using an Infinite Impulse Response (IIR) leaky-bucket filter, wherein the UE is instructed to configure coefficients of the filter so as to vary a damping factor or smoothing of the filter.

14. The base station of claim 1, wherein the base station is configured to determine the estimate of the current UE transmit power used by the UE to transmit to the base station as a sum of the received power for the UE and the path loss for the UE.

15. The base station of claim 1, wherein the base station is configured to implement a combining receiver; and
   wherein the determined estimate of the current UE transmit power used by the UE to transmit to the base station determined by the base station takes into account receive diversity combining gain resulting from use of the combining receiver.

16. A method of estimating a current user equipment (UE) transmit power used by a UE to transmit to a base station, the method comprising:
   determining, at the base station serving said UE, a received power for said UE;
   determining, at the base station, a path loss for said UE; and
   determining, at the base station, an estimate of the current UE transmit power used by said UE to transmit to the base station as a function of the received power for said UE and the path loss for said UE.

17. The method of claim 16, wherein the method is performed when said UE has reached or exceeded a maximum reported power headroom (PHR) for said UE.

18. The method of claim 16, further comprising performing transmit power control for said UE to control the transmit power used by said UE to transmit to the base station as a function of the determined estimate of the current UE transmit power used by said UE to transmit to the base station.

19. The method of claim 18, wherein performing transmit power control for said UE to control the transmit power used by said UE to transmit to the base station as a function of the determined estimate of the current UE transmit power used by said UE to transmit to the base station comprises:
   performing transmit power control for said UE to control the transmit power used by said UE to transmit to the base station as a function of the determined estimate of the current UE transmit power used by said UE to transmit to the base station in order to cause said UE to transmit at a minimum power level necessary for said UE to meet a target SINR required for a modulation and coding scheme (MCS) used for transmissions from said UE.

20. The method of claim 18, wherein performing transmit power control for said UE as a function of the determined estimate of the current UE transmit power used by said UE to transmit to the base station comprises:
   performing transmit power control for said UE to control the transmit power used by said UE to transmit to the base station as a function of the determined estimate of the current UE transmit power used by said UE to transmit to the base station in order to reduce battery consumption in said UE.

21. The method of claim 18, wherein performing transmit power control for said UE to control the transmit power used by said UE to transmit to the base station as a function of the determined estimate of the current UE transmit power used by said UE to transmit to the base station comprises:
   performing transmit power control for said UE to control the transmit power used by said UE to transmit to the base station as a function of the determined estimate of the current UE transmit power used by said UE to transmit to the base station in order to keep at least one of:
   intra-cell interference caused by transmissions of said UE below an intra-cell interference threshold and inter-cell interference caused by transmissions of said UE below an inter-cell interference threshold.

22. The method of claim 18, wherein performing transmit power control for said UE to control the transmit power used by said UE to transmit to the base station as a function of the determined estimate of the current UE transmit power used by said UE to transmit to the base station comprises:
   performing transmit power control for said UE to control the transmit power used by said UE to transmit to the base station as a function of the determined estimate of the current UE transmit power used by said UE to transmit to the base station in order to reduce Rise-over-Thermal interference in neighboring radio points or base stations.

23. The method of claim 16, wherein determining the received power for said UE comprises:
   determining a power spectral density of Demodulation Reference Signals (DMRSs) transmitted by said UE; and
   determining the received power for said UE as a function of the power spectral density of the DMRSs transmitted by said UE and the number of RBs granted by L2 functionality in the base station.

24. The method of claim 16, wherein determining the path loss for said UE comprises:
   configuring the L3 functionality with a specified transmit power for Cell Specific Reference Signals (CS-RSs) depending on the LTE system bandwidth;
   reporting, to the L2 functionality by the L3 functionality, the specified transmit power for the CS-RSs configured;
   transmitting, to said UE, the CS-RSs at the specified transmit power;
   receiving a Reference Signal Received Power (RSRP) reported by said UE; and
   determining the path loss for said UE as a function of the specified transmit power level at which the CS-RSs are transmitted to said UE and the RSRP reported by said UE.

25. The method of claim 24, further comprising reducing the frequency at which the RSRP is reported by said UE to the base station by doing the following:
   configuring said UE to report to the base station a power headroom (PHR) measured by said UE in response to a trigger event that is based on a downlink pathloss change (dl-PathlossChange) trigger event; and
   causing said UE to report a respective RSRP in response to receiving each PHR measured and reported by said UE.

26. The method of claim 24, further comprising reducing uncertainty in the estimated path loss due to short-term fading on the RSRP reported by said UE to the base station by instructing said UE to use an average of measurements across multiple radio frames for the RSRP reported by said UE.

27. The method of claim 24, further comprising reducing uncertainty in the estimated path loss due to short-term fading on the RSRP reported by said UE to the base station by also instructing said UE to filter the measurements across multiple radio frames using an Infinite Impulse Response (IIR) leaky-bucket filter, wherein said UE is instructed to configure coefficients of the filter so as to vary a damping factor or smoothing of the filter.

28. The method of claim 16, wherein determining the current UE transmit power used by said UE to transmit to the base station as a function of the received power for said UE and the path loss for said UE comprises:
   summing the received power for said UE and the path loss for said UE.

29. The method of claim 16, wherein the base station comprises at least one controller and a plurality of radio points;
   wherein each of the radio points is associated with at least one antenna and remotely located from the controller, wherein the plurality of radio points is communicatively coupled to the controller;
   wherein the controller is communicatively coupled to a core network of a wireless service provider.

30. The method of claim 16, wherein the base station is configured to implement a combining receiver; and
   wherein determining, at the base station, the estimate of the current UE transmit power used by said UE to transmit to the base station comprises taking into account receive diversity combining gain resulting from use of the combining receiver.

* * * * *